United States Patent [19]  
Magara

[11] 4,185,842  
[45] Jan. 29, 1980

[54] SEAL RING

[75] Inventor: Kentaro Magara, Urawa, Japan

[73] Assignee: Nippon Piston Ring Co., Ltd., Tokyo, Japan

[21] Appl. No.: 923,287

[22] Filed: Jul. 10, 1978

[30] Foreign Application Priority Data

Jul. 8, 1977 [JP] Japan .................................. 52-91467

[51] Int. Cl.$^2$ ............................. F16J 9/20; F16J 9/02
[52] U.S. Cl. ................................... 277/194; 277/165; 277/216
[58] Field of Search ..................... 277/70, 165, 188 R, 277/188 A, 192, 194, 216

[56] References Cited

U.S. PATENT DOCUMENTS

| 1,822,101 | 9/1931 | Lewis | 277/194 |
|---|---|---|---|
| 2,898,134 | 8/1959 | Moskow | 277/188 R |
| 3,494,624 | 2/1970 | Woodling | 277/165 X |
| 3,612,538 | 10/1971 | Sievenpiper | 277/165 |
| 3,632,121 | 1/1972 | Wahlmark | 277/194 X |
| 3,806,134 | 4/1974 | Schexnayder | 277/165 X |
| 4,132,420 | 1/1979 | Lundholm | 277/194 X |

FOREIGN PATENT DOCUMENTS

| 217406 | 9/1958 | Australia | 277/165 |
|---|---|---|---|
| 733653 | 3/1943 | Fed. Rep. of Germany | 277/188 R |
| 736327 | 6/1943 | Fed. Rep. of Germany | 277/188 R |
| 1135032 | 12/1956 | France | 277/70 |
| 1161529 | 8/1969 | United Kingdom | 277/188 R |
| 1222609 | 2/1971 | United Kingdom | 277/194 |

Primary Examiner—Robert S. Ward, Jr.  
Attorney, Agent, or Firm—Sughrue, Rothwell, Mion, Zinn and Macpeak

[57] ABSTRACT

An improved composite seal ring is provided by making the L-shaped main seal ring and auxiliary seal ring of a thermoplastic or thermosetting synthetic resin and the ratio of the axial thickness of the thin wall portion of the main seal ring to the axial thickness of the entire composite seal ring being between ½ and ¾ and the auxiliary seal ring having a radial width at least twice as large as the piston-cylinder gap and less than 4/5 the radial width of the entire composite seal ring.

1 Claim, 5 Drawing Figures

SEAL RING

BACKGROUND OF THE INVENTION

This invention relates to a seal ring for use in Stirling engines on high pressure compressors to seal high-pressurized working liquid under oil-less or non-lubricating conditions.

In a conventional composite seal ring as shown in FIGS. 1 and 2, an annular recess 3 is formed in an outer peripheral surface of a main seal ring 1' at a position opposite to the pressure side as indicated by P to provide an L-shaped cross-section, and an auxiliary seal ring 4' is fitted into the recess so as to misalign a gap portion 11 of the seal ring 1' with a gap portion 41 of the auxiliary seal ring 4'.

According to the various experiments, in the conventional composite seal ring, if the ring is applied to the Stirling engine or high pressure compressor under a non-lubricating and high pressure condition such as above 50 kg/cm², a thin wall portion 12 of the L-shaped ring 1' is deformed into the gap portion 41 of the auxiliary seal ring 4' due to the high pressurized working liquid as shown in FIG. 3, whereby the gap 41 does not exhibit excellent sealing, and the sliding function of the auxiliary ring 4' with respect to an inner peripheral surface of a cylinder 5 may be degraded. Simultaneously, the auxiliary ring 4' may be deformed in wavy or corrugated configuration along the axial direction thereof, so that sealing performance in terms of upper and lower portions 13 and 14 of the rings may be deteriorated and these rings may not sustain adequate sealing during long use.

SUMMARY OF THE INVENTION

It is therefore an object of this invention to overcome the above-mentioned drawbacks and to provide an improved seal ring which exhibits excellent performance under high pressure conditions, such as above 50 kg/cm², and under non-lubricating or oil-less conditions.

Briefly and in accordance with the present invention, an L-shaped main seal ring and an auxiliary seal ring are made of thermoplastic or thermosetting synthetic resin, and the dimensions thereof are determined in the following ranges.

(a) The axial thickness of the thin wall portion of the L-shaped main ring is in a range of $\frac{1}{2}$ to $\frac{3}{4}$ of the entire axial thickness of the composite seal ring.

(b) The radial width of the auxiliary seal ring is more than twice as large as a clearance defined between an outer periphery of a piston and an inner perihery of a cylinder, and the radial width of the auxiliary seal ring is less than 4/5 of the entire radial width of the composite seal ring.

DETAILED DESCRIPTION OF THE INVENTION

Figure 1:
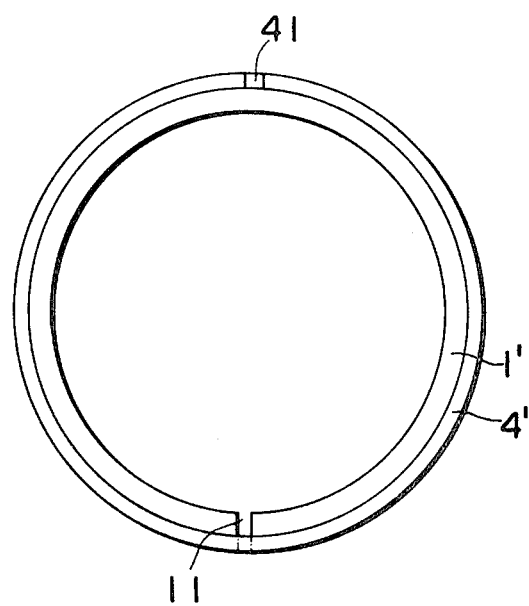
FIG. 1 shows a bottom view of a conventional composite seal ring.
Figure 2:
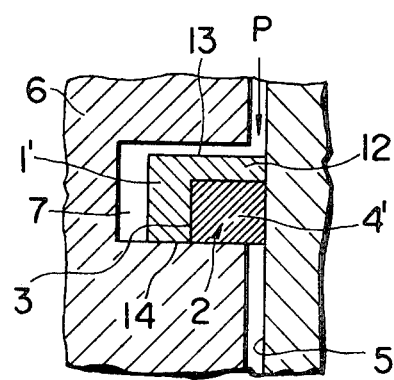
FIG. 2 shows a cross-sectional view illustrating the application of the conventional composite seal ring into a piston to provide a sliding relationship with a cylinder.
Figure 3:
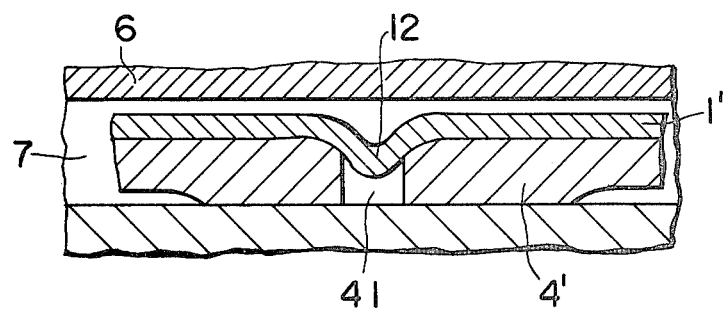
FIG. 3 shows a side view of the conventional seal ring, wherein the deformation of the ring is exaggeratedly shown.
Figure 4:
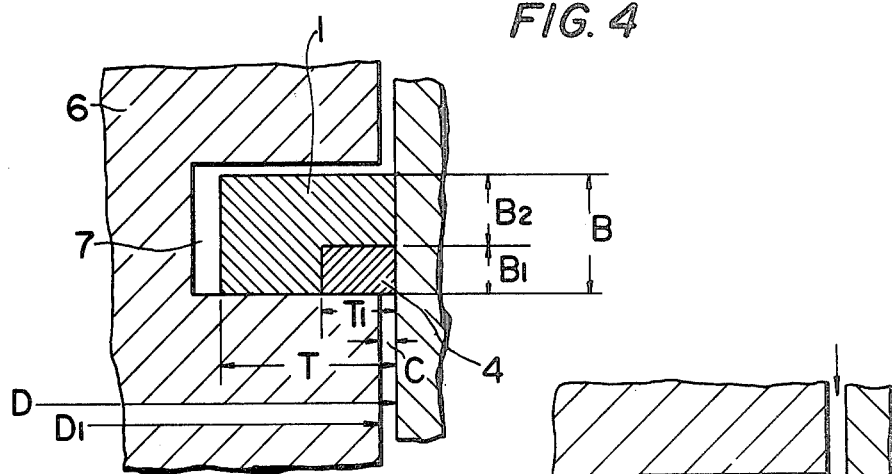
FIG. 4 shows a cross-sectional view of a composite seal ring in accordance with the present invention.

The present invention will now be described in detail with reference to FIG. 4 wherein an L-shaped main seal ring 1 and an auxiliary seal ring 4 are both made of thermoplastic synthetic resin such as polytetrafluoroethylene or thermosetting synthetic resin such as polyimid resin in order to enable these rings to be used under nonlubricating conditions. The composite seal ring is fitted into an annular groove 7 formed in a piston 6. The axial clearance defined between the annular groove 7 and the upper and lower peripheral surfaces of the composite ring should be as small as possible in light of the operating temperature.

The axial thickness $B_2$ of a thin wall portion of the L-shaped main seal ring 1 is in a range of $\frac{1}{2}$ to $\frac{3}{4}$ of the entire axial thickness B of the composite ring. If the thickness $B_2$ is less than $\frac{1}{2}$ of the entire thickness B, the thin-wall portion of the L-shaped ring may be deformed into a gap portion of the auxiliary seal ring 4 as seen in the conventional seal ring, while if the thickness $B_2$ is more than $\frac{3}{4}$ of the thickness B, the axial thickness $B_1$ of the auxiliary seal ring 4 must be too small, thereby lowering the mechanical strength thereof, with the result that this composite ring may not be usable.

Further, the radial width $T_1$ of the auxiliary seal ring 4 is more than twice as large as a clearance C defined between an outer diameter $D_1$ of the piston 6 and an inner diameter D of the cylinder, and the width $T_1$ is less than 4/5 as large as a radial width T of the composite seal ring. If the radial width $T_1$ is less than twice as large as the clearance C, it would be rather difficult to support the auxiliary ring in the annular recessed portion of the main seal ring due to the large moment about the pivot point at the outer peripheral edge of the piston, whereby desirable sliding movement thereof may not be performed, while if the radial width $T_1$ is more than 4/5 of the entire width T, the mechanical strength of the inner wall portion of the main ring is extremely lowered.

In producing the seal ring, it is extremely advantageous to mix the above mentioned synthetic resin material with additives such as molybdenum disulfide, carbon and glass fiber to enhance material characteristics including self-lubrication.

The composite seal ring in accordance with the present invention exhibits a quite advantageous effect when used as a seal ring for the Stirling engine.

Figure 5:
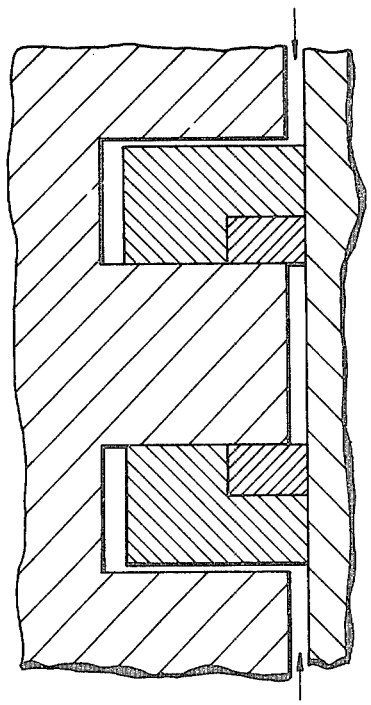
FIG. 5 shows a cross-sectional view of the present invention, wherein two pairs of composite rings are fitted into a piston.

In FIG. 5, two pairs of composite seal rings are fitted into two annular grooves of a piston, in case the pressure is exerted on the seal rings both upwardly and downwardly as in the double acting piston type Stirling engine. In this case, the auxiliary seal rings of each of the composite rings are confronted with each other to position these auxiliary rings opposite to the pressure sides.

What is claimed is:

1. In a gapped composite seal ring for a Stirling engine of the type having a main seal ring with an annular recess formed in the outer periphery thereof opposite the high pressure side of said main seal ring to form an L-shaped cross-section, and an auxiliary seal ring fitted into said annular recess, said composite ring sealing the clearance gap between the outer periphery of a piston and the inner periphery of a cylinder, the improvement comprising:

said main and auxiliary seal rings being made of thermoplastic or thermosetting synthetic resin, the axial thickness of the thin wall portion of the main seal ring being substantially between one-half and three-fourths the axial thickness of the entire composite ring and the radial width of said auxiliary seal ring being at least twice as large as said clearance gap and less than four-fifths of the radial width of the entire composite seal ring.

* * * * *